March 14, 1933.  E. P. KERRUISH  1,900,938
METHOD OF MAKING LINED BEARINGS
Filed Oct. 22, 1928
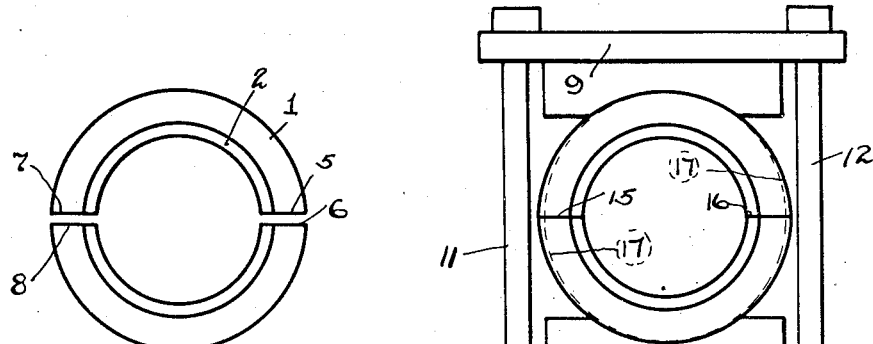
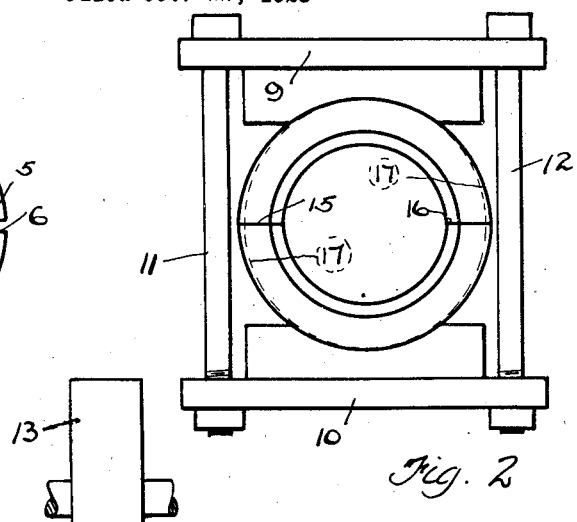
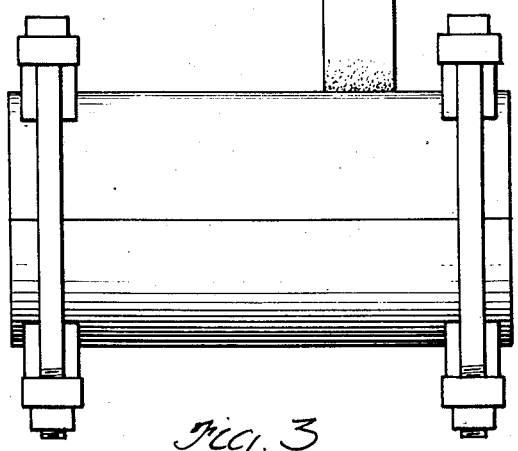
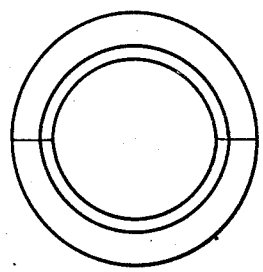
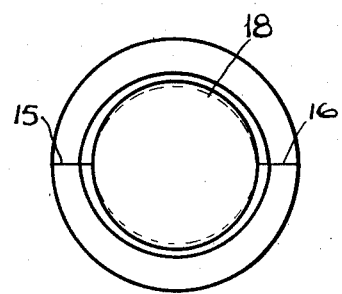
INVENTOR.
Edward P. Kerruish
BY
Fay, Oberlin & Fay
ATTORNEYS.

Patented Mar. 14, 1933

1,900,938

UNITED STATES PATENT OFFICE

EDWARD P. KERRUISH, OF CLEVELAND, OHIO, ASSIGNOR TO THE CLEVELAND GRAPHITE BRONZE COMPANY, OF CLEVELAND, OHIO, A CORPORATION OF OHIO

METHOD OF MAKING LINED BEARINGS

Application filed October 22, 1928. Serial No. 314,106.

The present invention, relating as indicated to bearings and method of making same, is more particularly directed to a method of reforming or retrueing half round lined bearings formed from complete cylinders after the cylinder has been sawed into two halves, thus removing a certain portion of the material and causing the two half round elements to form less than a true cylinder if their meeting edges are pressed together.

To the accomplishment of the foregoing and related ends, said invention, then, consists of the means hereinafter fully described and particularly pointed out in the claim; the annexed drawing and the following description setting forth in detail one method and one product exemplifying my invention, such disclosed procedure and product constituting, however, but one of various applications of the principle of my invention.

In said annexed drawing:—

Fig. 1 is an end elevation of a lined bearing split into two halves; Fig. 2 is an end elevation of two halves of the bearing shown in Fig. 1 mounted in a frame for an external grinding operation; Fig. 3 is a side elevation of one form of apparatus which may be employed in such grinding operation; Fig. 4 is an end elevation of the two halves of the bearing following this external grinding; and Fig. 5 is a view of the finished halves of the bearing after the subsequent internal surfacing operation.

In the making of lined bearings of either seamless or split tubing in which the supporting shell is formed of some material such as steel, and the lining of bearing material such as babbitt, it is necessary in the course of manufacture of the bearing to split or cut the cylinder in two halves. Regardless of how this cutting is performed a certain amount of material is actually removed from the shell, as indicated at the points 5 and 6 in Fig. 1, leaving two half round elements in the condition shown, and in such condition that, if pressed together, a less than true cylinder would result since a certain length of stock has been subtracted from the original total length of material which was included in the cylinder. It then becomes necessary to true up the resulting half-round bearings so that each is again returned to the condition of an exact half cylinder.

In Fig. 1 I have shown a bearing consisting of an outer shell of strong material, such as steel, to the inner surface of which is secured a layer of a bearing material 2, such as babbitt. This shell, whether formed of seamless or split tubing, is then cut upon a diametral plane, and this cutting operation causes the removal of a certain amount of material between the edges 5 and 6 and 7 and 8 at the points of separation in the shell. Hence when these two shells are pressed together, as illustrated in Fig. 2, they present an element of which neither outer nor inner surface are true cylinders and subsequent operations have to be performed on these elements to produce truly half-round bearing elements.

The present method of reforming the irregular semicylindrical shells consists in pressing the shells together as illustrated in Fig. 2 and clamping the same between members 9 and 10 by means of elements in the form of bolts 11 and 12. The bearing elements in these clamps are then acted upon by means of a grinding wheel 13 or other tool by the rotation of both the wheel and the clamped half-round elements until a truly cylindrical external surface has been produced on the elements, as shown in Fig. 4. This operation therefore involved the removal of more material adjacent the butts 15 and 16 between the half round bearings than at the points midway between these butts. The greater portion of the material is removed along the portions outside of the dotted lines 17 in Fig. 2 in order to bring the outer surface of the combined half round elements to a cylindrical condition. It will be understood that while I have here shown a grinding wheel as the operating tool, any suitable cutting tool may also be employed for this operation and that either the entire surface of the combined half round elements may be operated on by suitable adjustment of the clamping elements, or the end portions of the elements may be left in their original condition, thus providing flanges, which are sometimes required in this type of bearing and which are easily formed at this stage of their manufacture.

After the outer surface has been placed in a cylindrical condition the two half round elements may again be placed in any suitable form, clamp or fixture and the inside surface either machine turned, or it may still more readily be broached to this condition, preferably by first a roughening and then a finishing broaching operation. During these inside operations more stock is removed midway between the points 15 and 16 (see Fig. 5), indicating in an exaggerated manner the removal of the material during this operation. In Fig. 5 the condition of the half round elements following these operations is illustrated, the relationship between the inner and outer surfaces of the shell and bearing material being greatly exaggerated in order to show the removal of the material. It will be seen that the outer shell is thinner at the two edges than at the middle and that the lining material is thinner at the middle than at either edge, but these irregularities in the thickness of the tube walls are relatively minute and do not affect the satisfactory performance of the elements as bearings, while the present method affords a simple, rapid and relatively inexpensive method of reforming the half round bearings following the splitting of the original shell.

Other forms may be employed embodying the features of my invention instead of the one here explained, change being made in the form of construction, provided the elements stated by any of the following claims or the equivalent of such stated elements be employed, whether produced by my preferred method or by others embodying steps equivalent to those stated in the following claim.

I therefore particularly point out and distinctly claim as my invention:—

In a method of making lined bearings, the steps which consist in forming a roughly true cylindrical shell provided with a lining of bearing material, splitting the same along a diametral plane, clamping together the two split half cylinders, removing the stock from the outside of such clamped half cylinders to bring the same into a truly cylindrical condition, and then holding such half cylinders still clamped together while removing stock from the interior thereof to bring the interior surface of said half cylinders into a truly cylindrical condition concentric with the outside surface thereof.

Signed by me, this 20th day of October, 1928.

EDWARD P. KERRUISH.